United States Patent
Widdowson (10) Patent No.: US 8,295,683 B2
(45) Date of Patent: Oct. 23, 2012

(54) TEMPORAL OCCLUSION COSTING APPLIED TO VIDEO EDITING

(75) Inventor: Simon Widdowson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1583 days.

(21) Appl. No.: 11/789,201

(22) Filed: Apr. 23, 2007

(65) Prior Publication Data
US 2008/0260347 A1   Oct. 23, 2008

(51) Int. Cl.
*H04N 5/93* (2006.01)
*G11B 27/00* (2006.01)

(52) U.S. Cl. ........ 386/278; 386/280; 386/281; 348/445; 348/556; 348/578; 348/581; 382/309; 715/723; 715/722

(58) Field of Classification Search .................. 348/445, 348/448–452, 556; 715/723
See application file for complete search history.

(56) References Cited

U.S. PATENT DOCUMENTS

2004/0080670 A1* 4/2004 Cheatle .......................... 348/441
2006/0256134 A1* 11/2006 Widdowson .................. 345/629
* cited by examiner

*Primary Examiner* — Jefferey Harold
*Assistant Examiner* — Omer Khalid (57) ABSTRACT

In a method for determining a temporal occlusion cost for a video crop, video image saliency data for a video is received. A video crop is received for a presenting an edited version of the video within a viewing region. The video image saliency data is used to determine a temporal occlusion cost for the video crop.

20 Claims, 8 Drawing Sheets

```
RECEIVING VIDEO IMAGE SALIENCY DATA FOR A VIDEO.
310
                    ↓
RECEIVING A VIDEO CROP FOR A PRESENTING AN EDITED VERSION OF THE
VIDEO WITHIN A VIEWING REGION.
320
                    ↓
UTILIZING THE VIDEO IMAGE SALIENCY DATA TO DETERMINE A TEMPORAL
OCCLUSION COST FOR THE VIDEO CROP.
330
```

FIG. 12

TEMPORAL OCCLUSION COSTING APPLIED TO VIDEO EDITING

TECHNICAL FIELD

Embodiments of the present technology relate to editing of video images. More specifically, embodiments of the present technology relate to using temporal occlusion cost information applied to video editing.

BACKGROUND

Many reasons exist to edit videos. For example, it could be necessary to edit a video to convert the video from a first aspect ratio to a second aspect ratio, such as to convert a video from a wide screen format to a full screen format for viewing on a television or other display device. Similarly, it may be desirable to edit a video to shorten its length by removing less visually interesting portions of a video. Likewise, it may be desirable to edit a video such that the most visually interesting portions of the video are portrayed more prominently in a viewing region (such as a television or other electronic or projected display). These and other types of video editing typically require cropping saliency, area, and/or running time from an existing video and may also involve panning, zooming, changing the aspect ratio, or some other edit to the video.

Existing methods for video editing are typically manual or at least very manually intensive. Professional video editing software is typically complex and manually intensive, thus requiring either a professional video editor or substantial training to get good results. Likewise, consumer video editing products are also very manually intensive and require a steep learning curve in order to achieve good results when editing a video.

Consider, for example, the basic problem of editing a video to perform an aspect ratio conversion. In a manual conversion process, a user will typically need to guide a cropping frame throughout the entirety of the video to establish the area where the video is cropped to the new aspect ratio. This can be very time-consuming and the result generally varies in accordance with the skill of a user. A typical automated aspect ratio conversion may allow a user to select an initial position of a frame with respect to an existing video. The automated conversion then crops the entire video to conform to the initial user positioned frame, without regard to the content of the video. This automated form of aspect ratio conversion may deliver an acceptable result in some circumstances, however, more likely than not interesting visual features will be arbitrarily cropped from a video or poorly displayed in the converted video (such as at an edge).

The need to edit and display video content in an attractive and efficient manner is becoming increasingly prevalent due to the rapid rise in use of digital cameras, video recording devices, and video file sharing websites, coupled with the increasing prevalence of powerful viewing devices such as personal computers and multi-media home entertainment systems. However, as described, current methods for editing videos are either labor intensive or else suffer from drawbacks which arbitrarily eliminate interesting or important portions of a video being edited.

BRIEF DESCRIPTION OF THE DRAWINGS

The accompanying drawings, which are incorporated in and form a part of this specification, illustrate embodiments of the present technology for temporal occlusion costing applied to video editing and, together with the description, serve to explain principles discussed below.

The drawings referred to in this description should not be understood as being drawn to scale unless specifically noted.

DETAILED DESCRIPTION

Reference will now be made in detail to embodiments of the present technology for temporal occlusion costing applied to video editing, examples of which are illustrated in the accompanying drawings. While the subject matter is described in conjunction with various embodiments, it will be understood that they are not intended to limit the present technology to these embodiments. On the contrary, the present technology is intended to cover alternatives, modifications and equivalents, which may be included within the spirit and scope the various embodiments as defined by the appended claims. Furthermore, in the following detailed description, numerous specific details are set forth in order to provide a thorough understanding. However, the present technology may be practiced without these specific details. In other instances, well known methods, procedures, components, and circuits have not been described in detail as not to unnecessarily obscure aspects of the present technology.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the digital video editing arts to most effectively convey the substance of their work to others skilled in the art. A procedure, computer-executed step, logic block, process, etc., is here, and generally, conceived to be a selfconsistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system.

Unless specifically stated otherwise as apparent from the following discussions, it is appreciated that throughout the present detailed description, discussions utilizing terms such as "receiving", "utilizing", "determining", "controlling", "cropping", "generating", "selecting", "minimizing", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical and virtual computers. Additionally, it should be understood that in embodiments of the present technology, one or more of the steps can be performed manually.

Overview of Discussion

The present technology provides a means for automatically or mostly automatically editing or "cropping" a video. Through the use of temporal occlusion costing, the methods and systems described herein are able to select a video crop which balances the elimination of area, the elimination of saliency, and the elimination of running time in the cropping of a video. As compared to automated video crops which are arbitrarily selected, this balancing results in selection of video crops which improve the amount of salient (visually interesting) material which is displayed by an automatically cropped video.

For example, in one embodiment, by determining a temporal occlusion cost associated with a video crop, the balance of salience (visually interesting material), area, and running time eliminated as a result of the crop can easily be evaluated in comparison to other possible crops of the video or in comparison to a particular standard or goal. In many instances, this evaluation is performed with little or no user input or involvement, thus offering a simplified alternative to the otherwise difficult and/or time intensive video editing processes. In some instances, minimal user-specified inputs, related to, for example, video run time, speed of zoom transitions, speed of panning, and/or selection/marking of salient video image features are incorporated. Such user-specified parameters and constraints offer a way to reduce a potential solution space for possible video crop and/or customize generation/selection of a video crop or video image saliency data, while imposing little burden upon a user.

Discussion will begin with a description of an example computer system environment with which, or upon which, embodiments of the present technology may operate. Discussion will proceed to a description of an example system for determining a temporal occlusion cost for a video crop. Components of this system will be generally described. Operation of the system, and its components, will then be described in conjunction with description of an example method for determining a temporal occlusion cost for a video crop, and further with description of a method for cropping a video. Various example video crops will be discussed in conjunction with the description of these methods in order to promote the understanding of the methods and the system for determining a temporal occlusion cost for a video crop.

Example Computer System Environment

Figure 1:
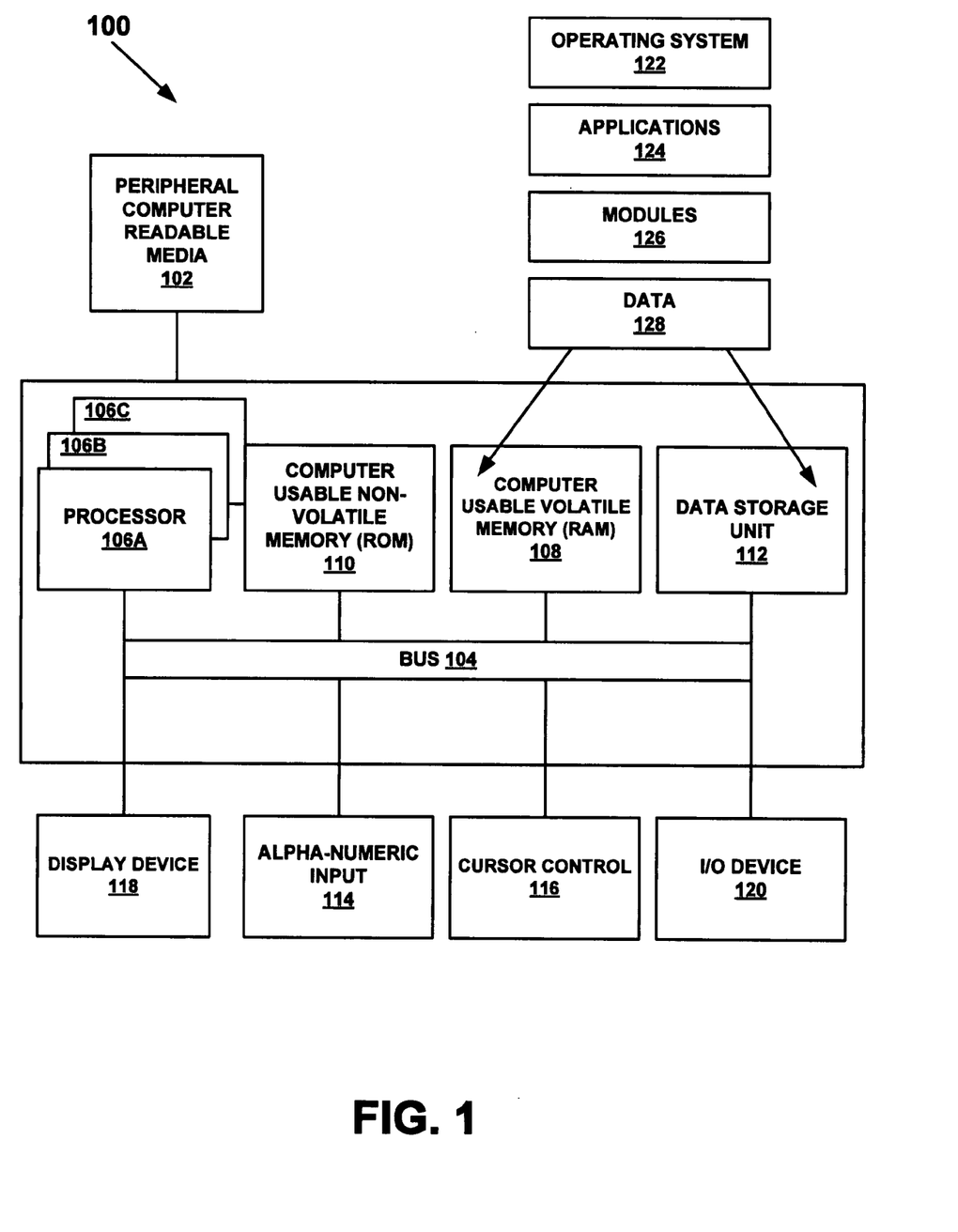
FIG. 1 is a diagram of an example computer system used in accordance with embodiments of the present technology.

With reference now to FIG. 1, portions of the present technology are composed of computer-readable and computer-executable instructions that reside, for example, in computer-usable media of a computer system. That is, FIG. 1 illustrates one example of a type of computer that can be used to implement embodiments, which are discussed below, of the present technology. FIG. 1 illustrates an example computer system 100 used in accordance with embodiments of the present technology. It is appreciated that system 100 of FIG. 1 is an example only, and that the present technology can operate on or within a number of different computer systems including general purpose networked computer systems, embedded computer systems, optical computer systems, virtual computer systems, server devices, client devices, various intermediate devices/nodes, stand alone computer systems, digital cameras, multimedia consoles, multimedia handheld devices, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors.

System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions.

System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 may be a liquid crystal device, cathode ray tube, plasma display device or other display device suitable for creating, presenting, or displaying graphic images (such as digital images and/or videos) and/or symbols or alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick, directional and input keys on a multimedia remote control, or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to having a cursor directed by other means such as, for example, voice commands.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology is stored, for example, as an application 124 or module 126 in memory locations within RAM 108, computer readable media within data storage unit 112, and/or peripheral computer readable media 102.

System for Determining a Temporal Occlusion Cost for a Video Crop

Figure 2:
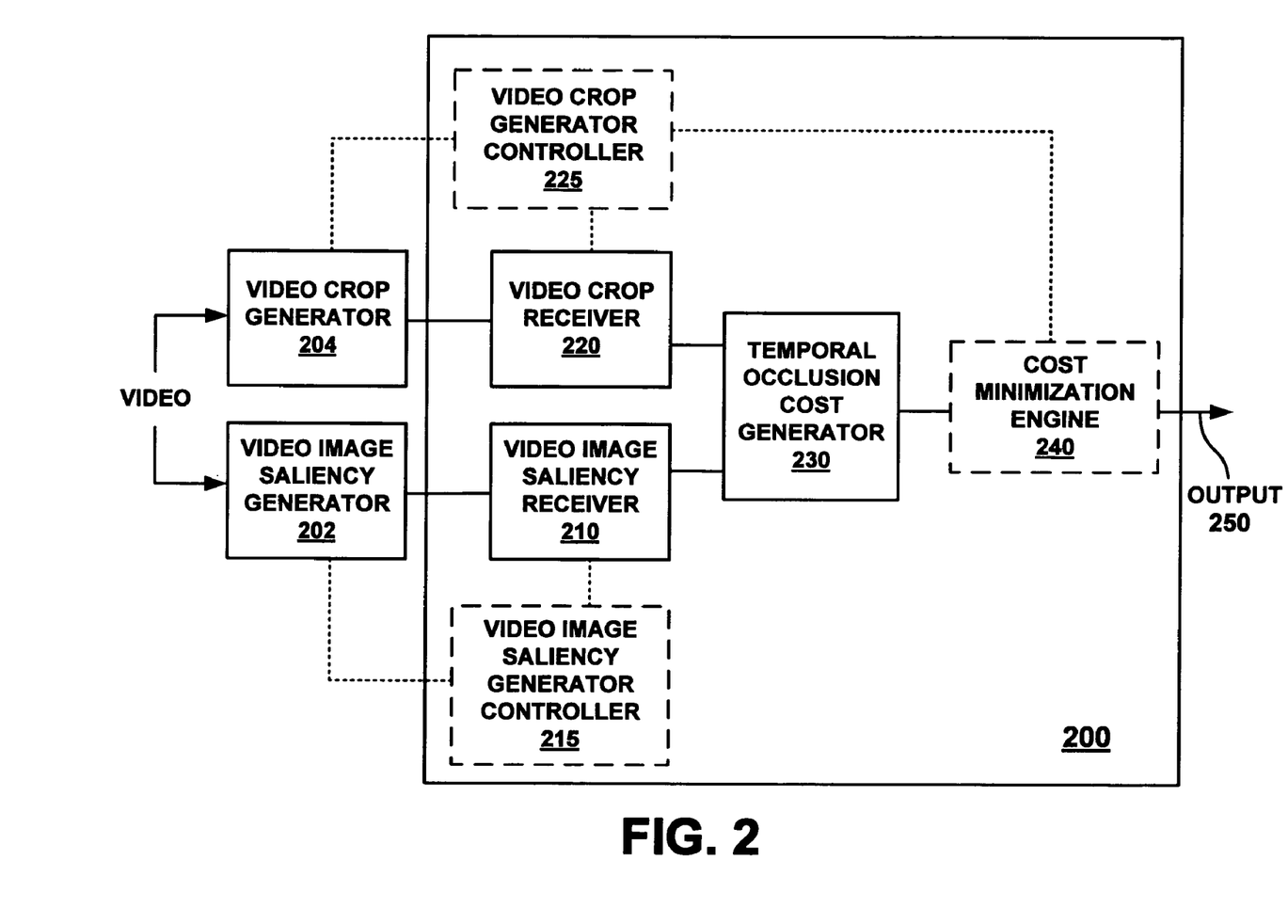
FIG. 2 is a block diagram of an example system for determining a temporal occlusion cost for a video crop, according to various embodiments.

With reference now to FIG. 2, a block diagram is shown of a system 200 for determining a temporal occlusion cost for a video crop. It is appreciated that system 200 illustrates one example embodiment, and that other configurations within the scope of the present technology are possible. As shown in FIG. 2, system 200 is comprised of a video image saliency receiver 210, a video crop receiver 220, and a temporal occlusion cost generator 230. Additionally, in some embodiments system 200 is also comprised of a video image saliency generator controller 215, a video crop generator controller 225, and/or a cost minimization engine 240.

Video image saliency receiver 210 receives image saliency data for a video. The video is configured to be displayed within a viewing region, such as display device 118 (FIG. 1). Video image saliency receiver 210 is coupled to external video image saliency generator 202 and receives video image saliency data from video image saliency generator 202. Video image saliency receiver 210 is also coupled to temporal occlusion cost generator 230 and passes received image saliency data to temporal occlusion cost generator 230. In one embodiment, video image saliency receiver 210 is also coupled to, or incorporates the functionality of, optional video image saliency generator controller 215.

If included, video image saliency generator controller 215 is coupled to external video image saliency generator 202. Video image saliency generator controller 215 allows default, automated, and/or user-specified control of one or more parameters used by video image saliency generator 202 in the determination of video image saliency data with respect to a video or frames thereof.

Video image saliency generator 202 generates video image saliency data for a video which is being evaluated by system 200. As will be described further herein, such video image saliency data describes, marks, ranks, and/or identifies one or more regions (such as a pixel, voxel, or the like) of a video or portion thereof (such as a single video frame) which are deemed to be salient (visually interesting). Such video image saliency data may be generated in accordance with one or more default, automatic, and/or user-specified parameters for identifying salient regions within a video or portion thereof.

For example, in one embodiment, video image saliency generator 202 receives a user-specified parameter from video image saliency generator controller 215. In various embodiments, video image saliency generator 202 supplies video image saliency information to video image saliency receiver 210 either piecemeal (such as for one video frame at a time) or for the entirety of a video.

Video crop receiver 220 is coupled with external video crop generator 204 for receiving one or more candidate video crops generated by video crop generator 204. A candidate video crop is a possible video crop for displaying an edited version of a video within a viewing region. As shown in FIG. 2, video crop receiver 220 is also coupled with temporal occlusion cost generator 230 and passes received video crops to temporal occlusion cost generator 230. In one embodiment, video crop receiver 220 is also coupled to, or incorporates the functionality of, optional video crop generator controller 225.

If included, video crop generator controller 225 is coupled to external video crop generator 204. Video crop generator controller 225 allows default, automatic, and/or user-specified control of constraints that are used by video crop generator 204 in the generation of a video crop from a video.

Video crop generator 204 generates one or more candidate (possible) crops to a video which is being evaluated by system 200. In one embodiment, video crop generator 204 generates a succession of crops. For example, in one embodiment, such crops may be generated in an unconstrained manner until a solution set of possible crops for a video is exhausted. In another embodiment, such crops may be generated in accordance with one or more default, automatic, or user-specified constraints which limit a possible solution set (number of possible crops) for a video. For example, in one embodiment, video crop generator 204 receives a default, automatic, or user-specified constraint from video crop generator controller 225 which limits it to generating only one hundred different video crops from a video. In various embodiments, video crop generator 204 supplies a cropped video to video crop receiver 220 either piecemeal (such as one frame at a time) or as an entire cropped video.

Temporal occlusion cost generator 230 receives video image saliency data for a video being evaluated for cropping. Temporal occlusion cost generator 230 also receives one or more possible crops in the form of candidate crops for displaying the video within a viewing region. In a manner further described below, temporal occlusion cost generator 230 utilizes the video image saliency data to generate or calculate a temporal occlusion cost for a received video crop.

In an embodiment which does not utilize cost minimization engine 240, a temporal occlusion cost calculated by temporal occlusion cost generator 230 is output. For example a temporal occlusion cost may be output on output 250 for use by another system or device. In other embodiments, a temporal occlusion cost which is output from temporal occlusion cost generator 230 is supplied as an input to optional cost minimization engine 240. For example, in one embodiment, as shown in the FIG. 2, temporal occlusion cost generator 230 is coupled to optional cost minimization engine 240.

Cost minimization engine 240, when utilized, operates to compare temporal occlusion costs of video crops and choose a lowest temporal occlusion cost of a plurality which are evaluated. In one embodiment, cost minimization engine 240 then selects and outputs, such as on output 250, the cropped video associated with the lowest evaluated temporal occlusion cost.

In some embodiments, cost minimization engine 240 is also coupled with video crop generator controller 225 to exert automated control over which video crops are generated from a video. For instance, cost minimization engine 240 may use one or more techniques to evaluate received temporal occlusion costs and then to project type of video crop which is likely to have lower temporal occlusion cost than those already evaluated. Via a coupling to video crop generator controller 225, one or more constraints are then applied to actively steer video crop generator 204 toward generating the type of video crop which will likely have a lower temporal occlusion cost. This active steering acts to reduce the number of video crops which are generated and then evaluated, thus reducing computation expense and increasing speed of system 200.

Figure 3:
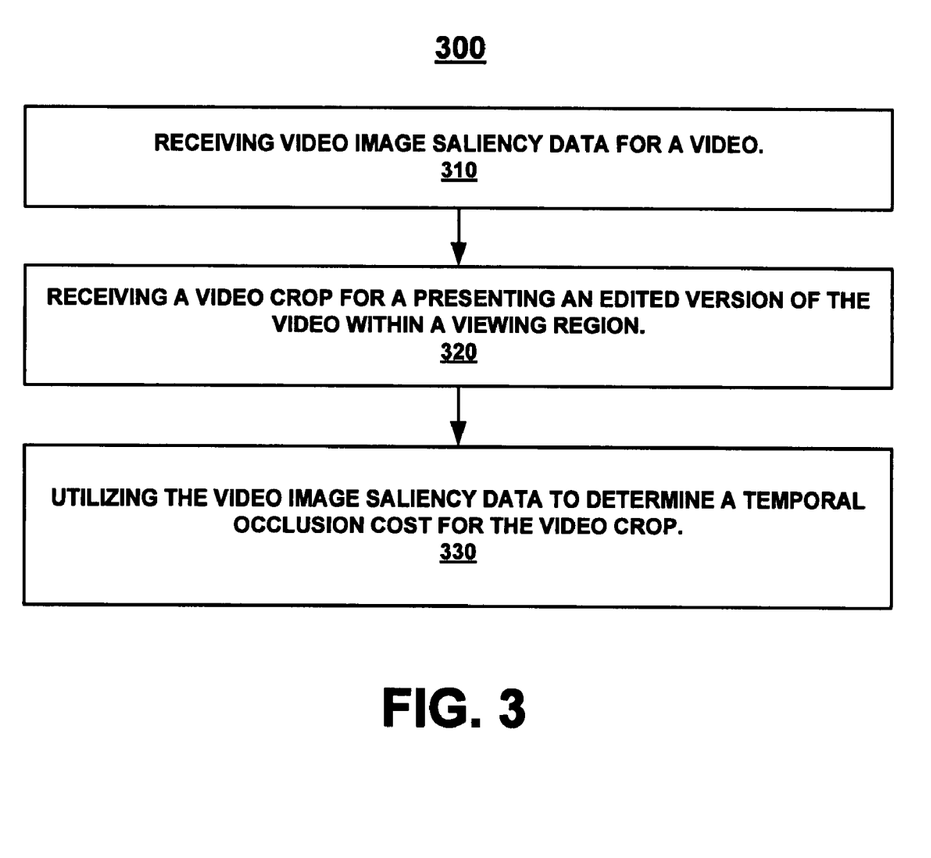
FIG. 3 is a flow diagram of an example method for determining a temporal occlusion cost for a video crop, according to one embodiment.
Figure 12:
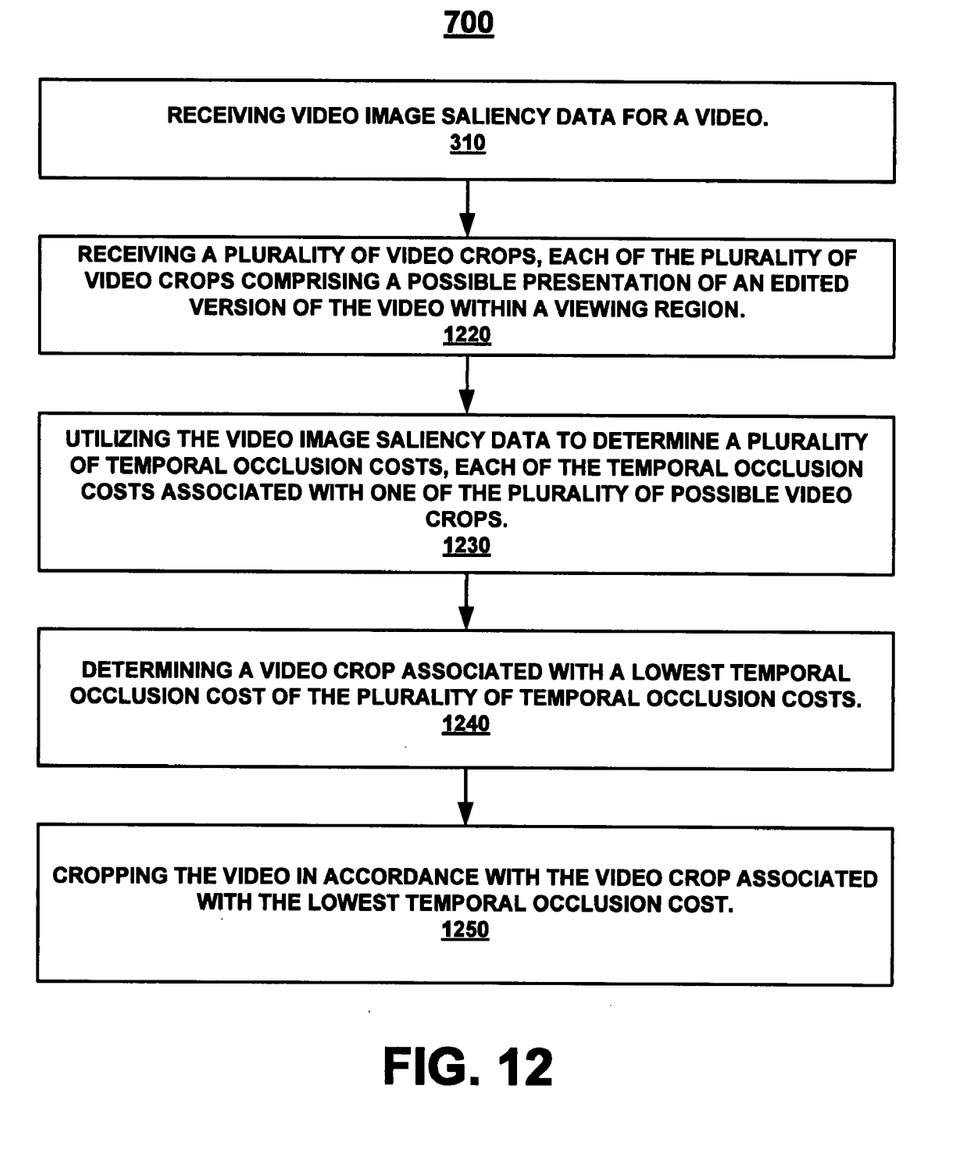
FIG. 12 is a flow diagram of an example method for cropping a video, according to one embodiment.

Operation of the Present System for Determining a Temporal Occlusion Cost for a Video Crop The following discussion sets forth in detail the operation of present technology through description of example embodiments. With reference to FIGS. 3 and 12, flow diagrams 300 and 1200 each illustrate example steps used by methods and/or processes according to various embodiments described herein. Flow diagrams 300 and 1200 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, and/or data storage unit 112 of FIG. 1. The computer-readable and computer-executable instructions are used to control or operate in conjunction with, for example, processor 106A and/or processors 106A, 106B, and 106C of FIG. 1. Although specific steps are disclosed in flow diagrams 300 and 1200 such steps are examples. It is appreciated that embodiments described herein are well suited to performing various other steps or variations of the steps recited, that the recited steps may be performed in an order different than presented, and that not all of the recited steps may be performed in every embodiment.

As used herein, the term "viewing region" generally refers to a display device, such as computer display, a video display, a television, a cellular phone display, or other electronic or projected display for displaying digital images.

As described herein, a video refers to a moving digital image such as may be captured via a digital camcorder, digital camera, or other digital image recording device. Generally, such videos are recorded, readable, or displayable as a series of still image frames which are displayed over time. For example, a video may be comprised of thirty still digital image frames per second. Such frames may be comprised of interlaced images, non-interlaced images, or images in other formats. The technology described herein is applicable any form of digital video, but for purposes of clarity of explanation will be described in reference to non-interlaced frames which comprise a complete viewable or displayable image for a defined period of time. It is appreciated that there are a variety of formats for recording and storing videos as digital files. One example of a video stored in a digital format is a video recorded in a Motion Picture Experts Group 4 (MPEG 4) video format.

As described herein, a crop is a form of video edit which removes some portion or all of the pixels/voxels of one or more viewable frames of a video. For example, in one instance, a crop may remove pixels/voxels from the left side, right side, or both the left and right sides of a video frame in order to change the aspect ratio of the video frame. In another instance, a crop may eliminate frames from the beginning, end, or some middle portion of a video in order to shorten the video or remove a less desirable portion of the video. The terms video crop and cropped video are often used interchangeably, and refer herein to the portion of an un-cropped video which remains after editing or cropping has eliminated running time, area, and/or saliency.

Techniques for recognizing objects and determining salient (or interesting) portions of images or frames within a video are known, and described in works such as, *A Model of Saliency-Based Visual Attention for Rapid Scene Analysis*, Laurent Itti, Christof Koch, and Ernst Niebur, IEEE Transactions on Pattern Analysis and Machine Intelligence, November 1998; and *Robust Real-Time Object Detection*, Paul Viola and Michael Jones, Second International Workshop on Statistical and Computational Theories of Vision—Modeling, Learning, Computing, and Sampling, Jul. 13, 2001. Such techniques may be applied by video image saliency generator 202, to carry out the generation of video image saliency data which is supplied to video image saliency receiver 210.

Method for Determining a Temporal Occlusion Cost for a Video Crop

FIG. 3 is a flow diagram 300 of a method, according to one embodiment, for determining a temporal occlusion cost for a video crop. Reference will be made to FIG. 2 and FIGS. 4-11 to facilitate explanation of the operation of flow diagram 300.

At 310 of flow diagram 300, in one embodiment, video image saliency data is received for a video. For example, in one embodiment, system 200 of FIG. 2 utilizes video image saliency receiver 210 to receive video image saliency data. As described below, in some embodiments the video image saliency data is received in the form of one or more video image saliency maps for a particular video.

Figure 4:
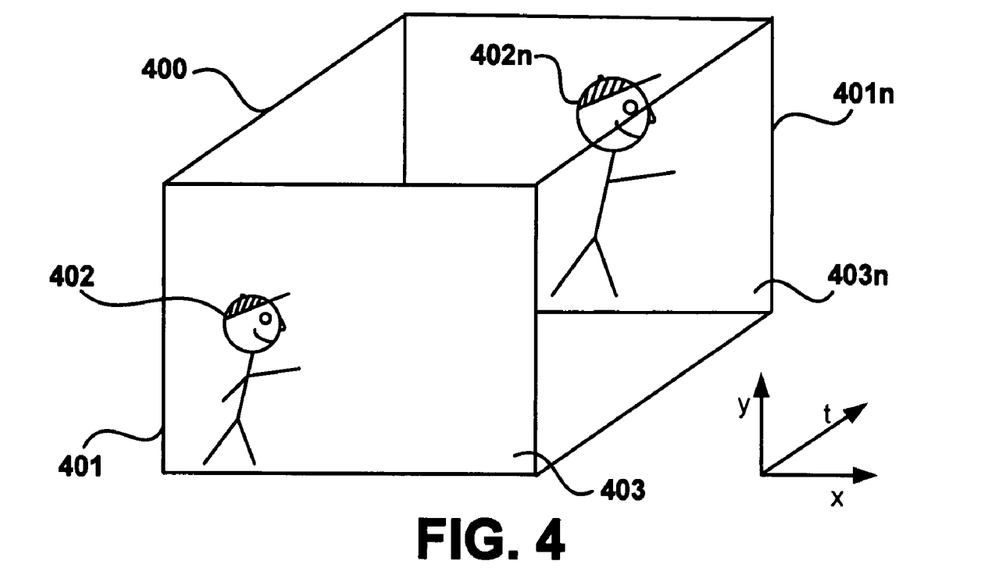
FIG. 4 represents an example video, according to one embodiment.

FIG. 4 represents an example video 400, according to one embodiment. Video 400 is shown as a cuboidal shape in which a plurality of video frames 401 to 401n are arrayed in sequence as they would be displayed over some time, t. For example, in an instance where video 400 is a ten second video which is comprised of thirty frames per second, video 400 is comprised of three hundred frames where frame 401 is frame number one and frame 401n is frame number three hundred. Each frame, 401 to 401n, has x and y dimensions from which a respective two-dimensional frame area can be calculated. Such dimensions may be in increments such as millimeters, inches, pixels, voxels, or some other form. Each frame, 401 to 401n, also has a respective time duration, t, which may be combined with the area of a particular frame or portion thereof to determine a three-dimensional space, or volume of the frame with respect to video 400. For example, each pixel of a frame, 401 to 401n, has a volume defined by dimensions x, y, and t, and can thus be referred to as a volumetric pixel, or "voxel." Likewise, the cumulated frames of video 400 together define video 400 as a three-dimensional space with dimensions of width (x), height (y), and running time (t).

Video 400 shows images of a person wearing a cap. Though video 400 is a simplistic video, it has been selected for the purpose of clearly explaining the concepts of the present technology. As shown in frame 401, the location 402 of the person is small and located on the left side of frame 401. Other than the person, frame 401 displays only empty, uninteresting content represented by location 403. During the course of video 400, the location of the person changes with respect to the frames of video 400 such that in frame 401n, the person is displayed in an enlarged fashion at location 402n, toward the middle right of frame 401n. As can be seen, frame

401n also displays only the person surrounded by empty, uninteresting content as represented by location 403n.

Image saliency data for an image, video, or video frame comprises information such as saliency maps, facial recognition information, and other image analysis information. For example, in one embodiment, video image saliency generator 202 generates video image saliency data for video 400 based on well-known and established image processing techniques, such as techniques for determining saliency and recognizing objects such as faces. In some embodiments, the image saliency information is also generated based on user-specified parameters received from optional video image saliency generator controller 215. Such video image saliency data may comprise a ranking or mapping of salient regions of a video (or portions thereof). For example, in some embodiments, a video (such as video 400) or a portion thereof (such as frame 401n) has saliency data generated in the form of a map, which may contain scores indicating the relative saliency of sections of the map.

Figure 5:
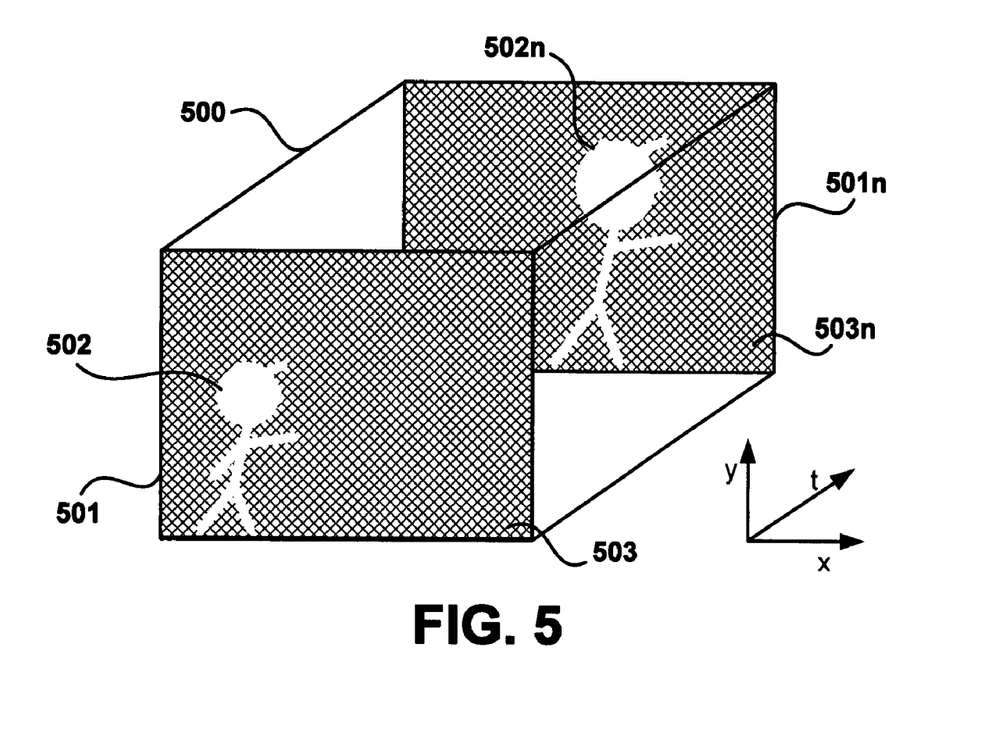
FIG. 5 represents an example of video image saliency data for the video of FIG. 4, according to an embodiment.

FIG. 5 represents an example of video image saliency data 500 for video 400 of FIG. 4, according to an embodiment. In one embodiment, video image saliency data generator 202 generates video image saliency data 500 as a plurality of grayscale saliency maps 501 to 501n, where saliency map 501 represents saliency of frame 401 and saliency map 501n represents saliency of frame 401n. In FIG. 5, each of the plurality of saliency maps (501 to 501n) shares the width (x) and height (y) dimensions and time duration (t) with the frame of video 400 which is respectively represented. Thus, the sum of saliency maps 501 to 501n forms a cuboidal volume of saliency voxels like the cuboidal volume of voxels of video 400. It is appreciated, however, that in some embodiments, saliency maps of video image saliency data 500 may be scaled up or down in comparison to video 400.

As shown, grayscale saliency map 501, utilizes a light color, such as white, in region 502 to represent the saliency of location 402 as containing highly salient information, and a dark color, such as black, in region 503 to indicate low or no saliency of location 403. Similarly, grayscale saliency map 501n, utilizes a light color, such as white, in region 502n to represent the saliency of location 402n as containing highly salient information, and a dark color, such as black, in region 503n to indicate low or no saliency of location 403n.

If user-specified image saliency generation parameters are utilized, video image saliency generator 202 generates the video image saliency data for the video according the user-specified parameters, and such video image saliency data is then received by video image saliency receiver 210.

For instance, in one embodiment, video image saliency generator controller 215 allows the user to assign greater weight, or saliency, to a region such as the center of a video or frame or a region containing an object such as a family pet or a face, regardless of the saliency result of the image processing techniques. In one embodiment, video image saliency generator controller 215 allows a user to assign a priority, from a range of priorities, to facial ranking in saliency maps, through the use of one or more user-specifiable image saliency parameters. In one embodiment, video image saliency generator controller 215 allows the user to designate portions of a video or frame, that must be preserved, but which might not otherwise be recognized as interesting via facial recognition or saliency analysis. In one embodiment, video image saliency generator controller 215 allows the user to designate regions of greater and lesser importance correspondingly increase or decrease saliency attributed to such regions. The previously listed examples are representative of video image saliency generator parameters that can be controlled by video image saliency generator controller 215. In other embodiments, a greater or lesser number of image saliency generation parameters can be controlled.

At 320 of flow diagram 300, in one embodiment, a video crop is received. The received video crop is configured for presenting an edited version of the video within a viewing region. For example, in one embodiment, system 200 of FIG. 2 utilizes video crop receiver 220 to receive one or more possible (candidate) video crops for evaluation. In addition to eliminating saliency, area, and/or running time, a received video crop may comprise a pan, a zoom, an aspect ratio conversion, or some combination thereof with respect to an un-cropped video. A received video crop is definable as a three-dimensional space (such as a cuboidal volume of voxels) with dimensions of a height, width, and running time that are bounded within the three dimensional space defined by a video, such as video 400. As will be demonstrated by example video crops illustrated herein, a cross-sectional area of a cuboidal volume of voxels which comprise a video crop may be either fixed or variable over time.

Figure 6:
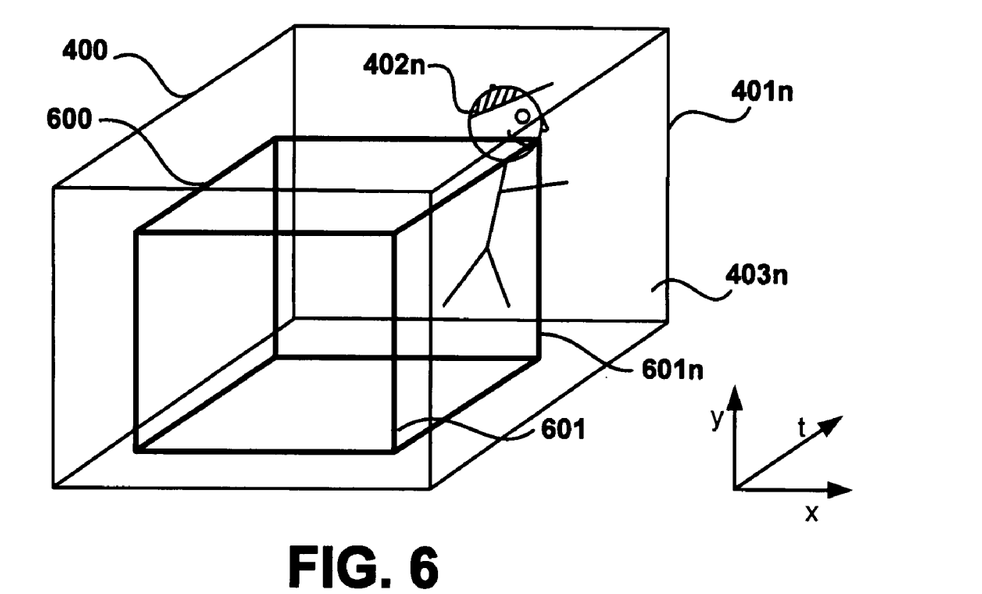
FIG. 6 shows an example video crop of the video of FIG. 4, according to an embodiment.

FIG. 6 shows a possible video crop 600 of the video of FIG. 4, according to an embodiment. For example, in one embodiment, video crop 600 is one of a plurality of possible (candidate) crops generated by video crop generator 204, and received by video crop receiver 220. In FIG. 6, for clarity, frame 401 of video 400 has been removed so that video crop 600 may be more clearly seen and discussed. With the exception of this alteration, remaining like figure numbers (402n, 410n, and 403n) are the same as previously described. As shown in FIG. 6, video crop 600 is represented as a cuboidal volume of voxels which is cropped from the cuboidal volume of video 400. Video crop 600 is also comprised of a plurality of cropped frames, 601 to 601n.

Video crop 600 is a very simple video crop. It is offset toward the center of video 400 and demonstrates how, in some video crops, running time in the form of some number of video frames may be cropped (discarded) from the beginning and/or the end of video 400. Video crop 600 also demonstrates that in video crops, area may be cropped from the left, right, top, and/or bottom of a video frame of video 400. Video crop 600 demonstrates a crop in which each cropped frame 601 to 601n has a frame which comprises a uniform x/y cross-sectional area of voxels. In other words, no consideration has been given to zooming in or out, relative to video 400, during the crop. Additionally, it should be noted that video crop 600 remains at a constant location with respect to video 400, and no consideration has been given to panning, relative to video 400, during the crop.

It is appreciated that, in one embodiment, video crop 600 is generated as a result of a user-specified video cropping constraint supplied via video crop generator controller 225. For example, video crop generator 204 may generate video crop 600 in response to user-specified video cropping constraints to eliminate five frames from the beginning and end of video 400 and thirty voxels from the top, bottom, left, and right sides of each frame of video 400. Likewise, video crop generator 204 may generate video crop 600 in response to user-specified constraints which give dimensions of the cuboidal volume of video crop 600, but contain no information regarding placement of the cuboidal volume with respect to video 400.

Figure 7:
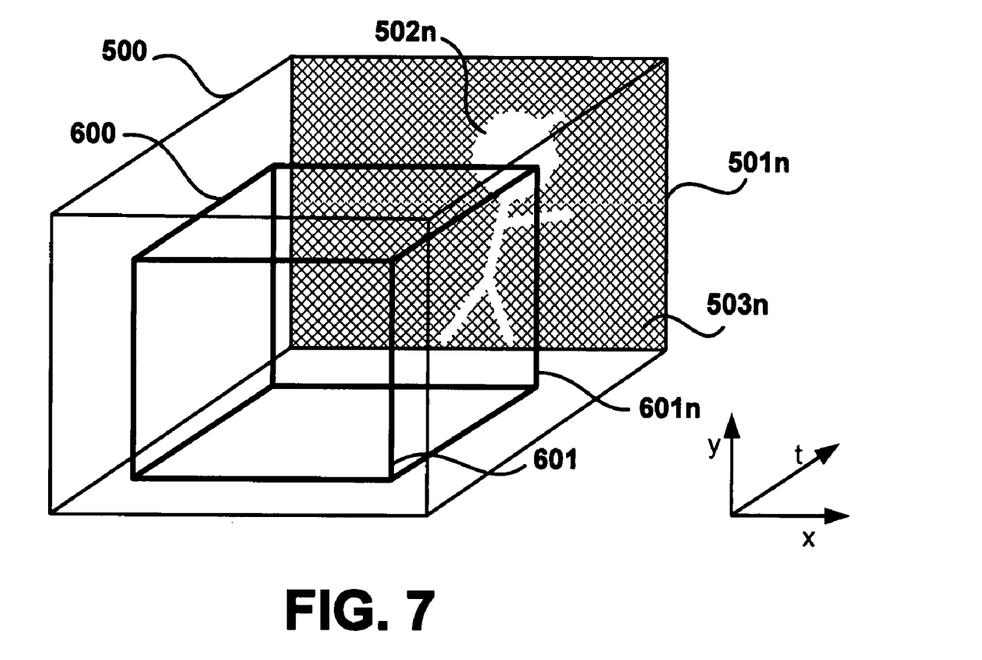
FIG. 7 shows the video crop of FIG. 6 in conjunction with the video image saliency data of FIG. 5, according to one embodiment.

FIG. 7 shows video crop 600 as a cuboidal volume of voxels in conjunction with video image saliency data 500 of FIG. 5, according to one embodiment. In FIG. 7, for clarity, saliency map 501 of video image saliency data 500 has been removed so that video crop 600 may be more clearly seen and discussed. With the exception of this alteration, like remaining figure numbers are the same as previously described in FIG. 5 and FIG. 6.

FIGS. 8, 9, 10, and 11 represent some of a plurality of different types of video crops (800, 900, 1000, 1100) which may be generated by video crop generator 204, either automatically or in response to user-specified video cropping constraints for controlling the cropping of a video. In addition to demonstrating the cropping of saliency, area, and/or running time, the video crops of FIGS. 8, 9, 10, and 11 demonstrate other cropping techniques such as panning, zooming and/or aspect ratio change.

Figure 8:
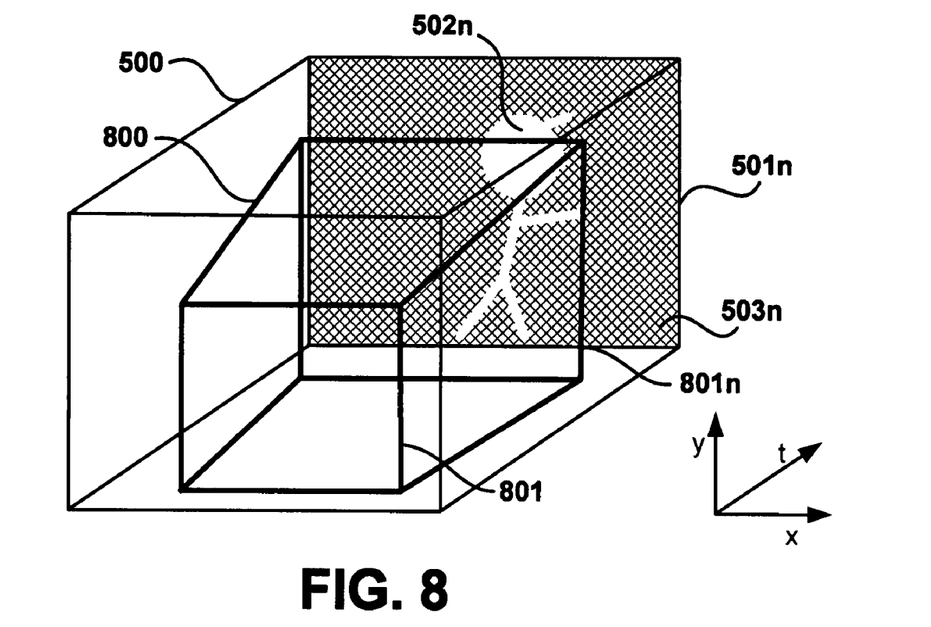
FIG. 8 shows a second example video crop of the video of FIG. 4 in conjunction with the video image saliency data of FIG. 5, according to one embodiment.

FIG. 8 shows a second example video crop 800 as a cuboidal volume of voxels in conjunction with video image saliency data 500 of FIG. 5, according to one embodiment. In FIG. 8, for clarity, saliency map 501 of video image saliency data 500 has been removed so that video crop 800 may be more clearly seen and discussed. With the exception of this alteration, remaining like figure numbers are the same as previously described in FIG. 5. Video crop 800 demonstrates a video crop in which each cropped frame 801 to 801$n$ has a cross-sectional area which may or does vary over time. In other words the number of voxels cropped by video crop 800 from the left, right, top and/or bottom of video 400 varies over time.

Video crop 800 demonstrates a crop in which each cropped frame 801 to 801$n$ may or does comprise a varying x/y cross-sectional area of voxels as compared to other frames. Video crop 800 represents a video crop which starts with a tight zoom at the beginning of the video crop, and then zooms out over time (though it may not be readily apparent, such zooming will be realized upon playback/display of video crop 800 as a video with uniformly rectangular x/y dimensions when displayed in a viewing region). Such a crop may be desirable, for example, when a person walks toward a camera and thus increases in size with respect to the field of view in a video. It is appreciated that, in one embodiment, video crop 800 is generated as a result of a user-specified video cropping constraint supplied via video crop generator controller 225. For example, video crop generator 204 may generate video crop 800 in response to a user-specified video cropping constraint which places a maximum limit upon the speed at which zoom rate is allowed to change over time in a cropped video.

Figure 9:
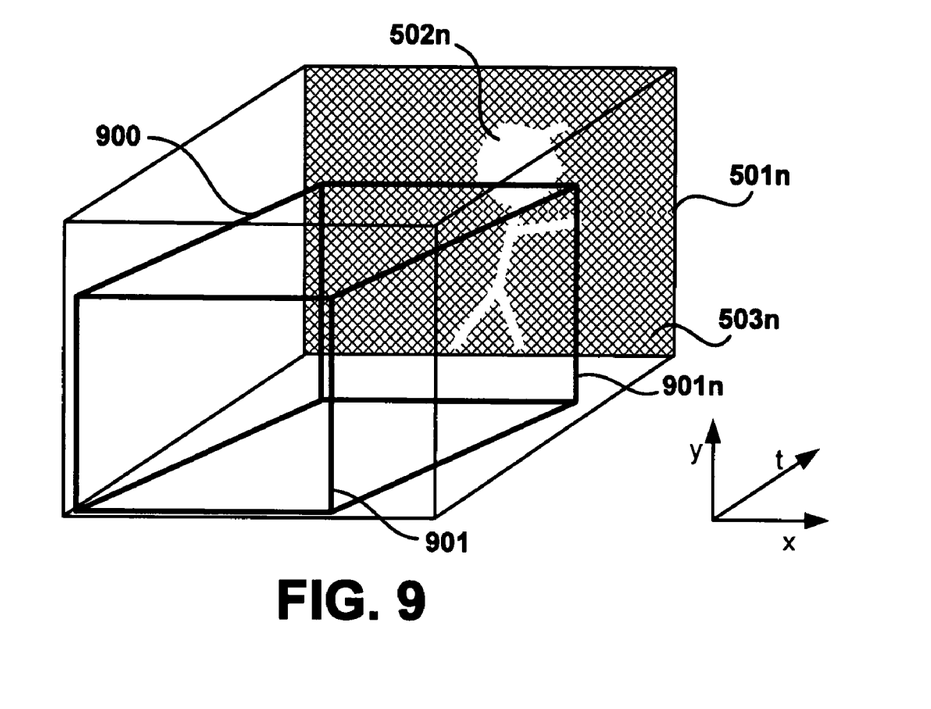
FIG. 9 shows a third example video crop of the video of FIG. 4 in conjunction with the video image saliency data of FIG. 5, according to one embodiment.

FIG. 9 shows a third example video crop 900 as a cuboidal volume of voxels in conjunction with video image saliency data 500 of FIG. 5, according to one embodiment. In FIG. 9, for clarity, saliency map 501 of video image saliency data 500 has been removed so that video crop 900 may be more clearly seen and discussed. With the exception of this alteration, remaining like figure numbers are the same as previously described in FIG. 5. Video crop 900 demonstrates a crop in which each cropped frame 901 to 901$n$ has a frame which comprises a uniform x/y cross-sectional area of voxels as compared to other cropped frames of video crop 900.

Video crop 900 demonstrates a video crop in which the number of voxels cropped from each side of the cropped frames of video 400 is allowed to change over time. However, instead of zooming in or out as in video crop 800, video crop 900 represents a video crop which pans from one side of video 400 toward the other side of video 400. Such a crop may be desirable, for example, when a person walks across the field of view of a video. It is appreciated that, in one embodiment, video crop 900 is generated as a result of a user-specified video cropping constraint supplied via video crop generator controller 225. For example, video crop generator 204 may generate video crop 900 in response to a user-specified video cropping constraint which places a maximum limit upon the speed at which pan rate is allowed to change over time in a cropped video.

Figure 10:
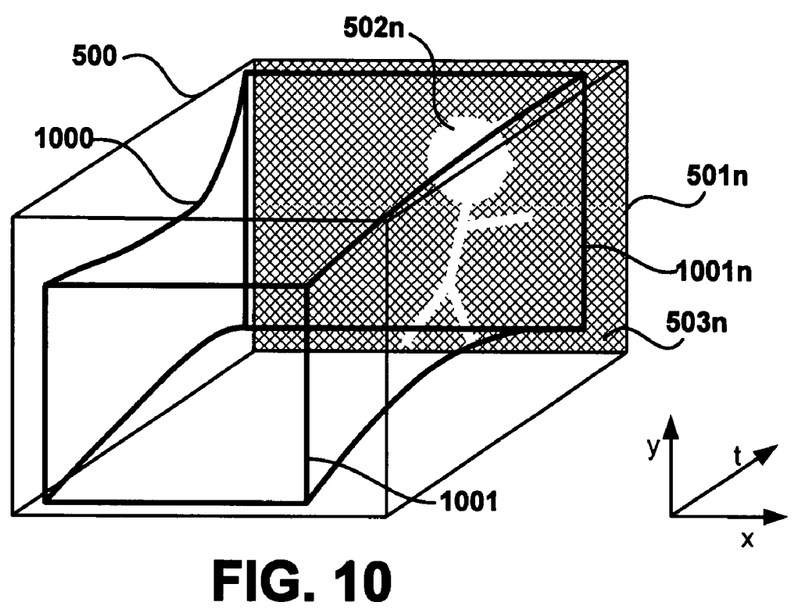
FIG. 10 shows a fourth example video crop of the video of FIG. 4 in conjunction with the video image saliency data of FIG. 5, according to one embodiment.

FIG. 10 shows a fourth example video crop 1000 as a cuboidal volume of voxels in conjunction with video image saliency data 500 of FIG. 5, according to one embodiment. In FIG. 10, for clarity, saliency map 501 of video image saliency data 500 has been removed so that video crop 1000 may be more clearly seen and discussed. With the exception of this alteration, remaining like figure numbers are the same as previously described in FIG. 5. Video crop 1000 demonstrates a fully generalized case of a video crop in which each cropped frame 1001 to 1001$n$ has a cross-sectional area which may or does vary over time. In other words, the number of voxels cropped by video crop 1000 from the left, right, top and/or bottom of video 400 varies over time.

Video crop 1000 demonstrates a crop in which each cropped frame 1001 to 1001$n$ may or does comprise a varying x/y cross-sectional area of voxels as compared to other frames. Video crop 1000 represents a video crop which starts with a tight zoom at the beginning of the video crop, and then zooms inward and eventually outward over time. Simultaneously to the zooming, video crop 1000 pans gently from right to left over time. Such a crop may be desirable, for example, when a person walks to various places within the field of view during a video. It is appreciated that, in one embodiment, video crop 1000 is generated as a result of a user-specified video cropping constraint supplied via video crop generator controller 225. For example, video crop generator 204 may generate video crop 1000 in response to a user-specified video cropping constraint which places a maximum limit upon the speed at which zoom rate and/or pan rate is allowed to change over time in a cropped video.

Figure 11:
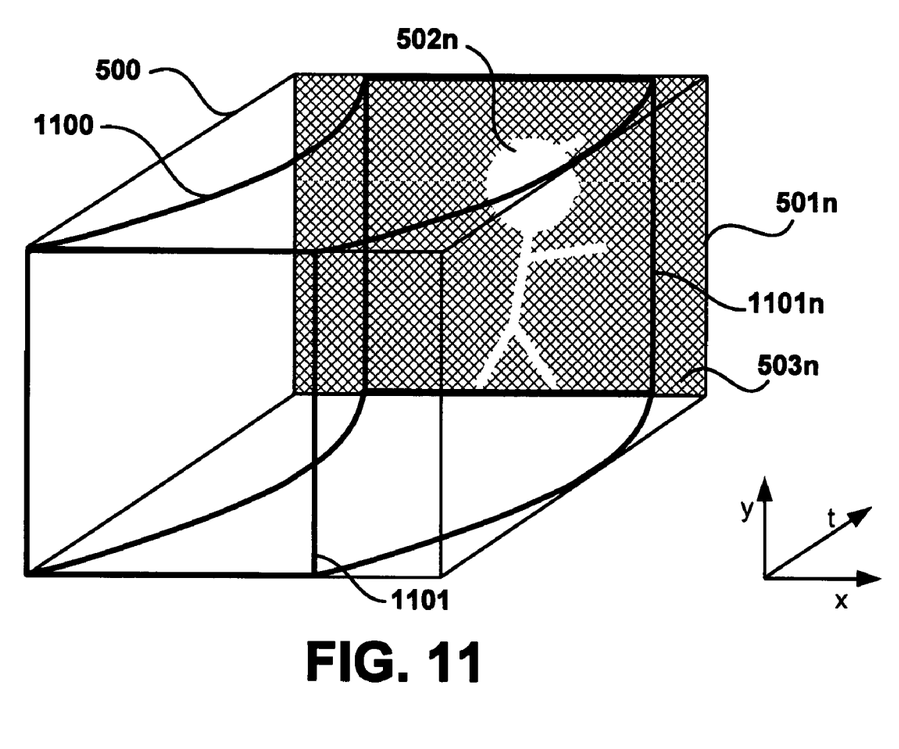
FIG. 11 shows a fifth example video crop of the video of FIG. 4 in conjunction with the video image saliency data of FIG. 5, according to one embodiment.

FIG. 11 shows a fifth example video crop 1100 as a cuboidal volume of voxels in conjunction with video image saliency data 500 of FIG. 5, according to one embodiment. In FIG. 11, for clarity, saliency map 501 of video image saliency data 500 has been removed so that video crop 1100 may be more clearly seen and discussed. With the exception of this alteration, like figure numbers are the same as previously described in FIG. 5. Video crop 1100 demonstrates a crop in which each cropped frame 1101 to 1101$n$ has a frame which comprises a uniform x/y cross-sectional area of voxels.

Video crop 1100 demonstrates a typical aspect ratio changing video crop in which the number of voxels cropped from each side of the cropped frames of video 400 is allowed to change over time. However, instead of zooming in or out as in video crop 800, video crop 1100 represents a video crop which pans from one side of video 400 toward the other side of video 400 and then back. Such a crop may be desirable, for example, when performing a "pan and scan" type aspect ratio conversion to convert, for instance, from a "wide screen" movie format aspect ratio to a "full screen" aspect ratio compatible with the viewing region of a television or other display device. It is appreciated that, in one embodiment, video crop 1100 is generated as a result of a user-specified video cropping constraint supplied via video crop generator controller 225. For example, video crop generator 204 may generate video crop 1100 in response to a user-specified video cropping constraint which places a maximum limit upon the speed at which pan rate is allowed to change over time in a cropped video.

At 330 of flow diagram 300, in one embodiment, the video image saliency data associated with a received video crop is utilized to determine a temporal occlusion cost for the received video crop. For example, in one embodiment, system 200 of FIG. 2 utilizes temporal occlusion cost generator 230 to determine a temporal occlusion cost of a received video crop. In one embodiment, as will be demonstrated, determining a temporal occlusion cost for a video crop comprises determining a value which varies in accordance with saliency eliminated by the received video crop, video frame area eliminated by the received video crop, and video running time eliminated by the received video crop.

In one embodiment, temporal occlusion cost generator 230 utilizes one or more equations like those shown within Table 1, Table 2, and Table 3 when determining a temporal occlusion cost for a received video crop. The equations shown in Table 1, Table 2, and Table 3 rely on the use of video image saliency data, such as, for example, the saliency data of saliency maps. As described, saliency maps and many other techniques for determining image saliency data are well known. Saliency maps, for example, typically provide a corresponding mapping of salient regions for a particular image. For instance, in some embodiments, video image saliency data is represented as a map in the form of a grayscale image for each video frame in an un-cropped video, where the numerical grayscale value of each voxel in each grayscale image represents the saliency score for that voxel. In such a saliency map, saliency values may be assigned on a scale, for example from 0 to 255, with the highest saliency represented by a white voxel and a value of 255 and the lowest saliency represented by a black voxel and a value of 0. Equations displayed in Tables 1-3 represent techniques for summing these corresponding saliency values to determine specific occlusion costs for an video crop or portion thereof (such as a frame).

In one embodiment, temporal occlusion cost generator 230 determines a quantitative occlusion cost associated with the relative position(s) of, and any potential occlusion of saliency which occurs due to a video crop (for example by cropping out a salient feature such as all or a portion of locations 401 to 401n). One example of a method used to derive an occlusion cost for a cropped frame or an entire cropped video is shown by the cost equation of Table 1.

The equation in Table 1 calculates the level of saliency for occluded regions (cropped out regions) of a video and divides it by the total sum of the saliency in the entire video. As shown by the equation of Table 1, in one embodiment, this can be accomplished by summing the occlusion costs of all of the frames of a video. The result is an occlusion cost for having saliency of a cropped region of a video eliminated or otherwise occluded by a video crop. The cost value, C, is generated in a range from zero to one and can be thought of as a percentage. A cost (C) closer to one equals nearly total occlusion; while a cost closer to zero indicates very little occlusion.

TABLE 1

Example Equation for Calculation Occlusion Cost of a Video Crop $$C = \sum_{\substack{all \\ video \\ frames}} \frac{S_O}{S_T}$$

Where:
C = cost
$S_O$ = total saliency occluded in by a frame of a cropped video
$S_T$ = total saliency of the un-cropped version of the cropped frame It is appreciated that safeguards are built into temporal occlusion cost generator 230 to prevent potential errors which could occur when zero saliency is occluded or when the total saliency of an un-cropped frame is found to be zero. It should be appreciated that, in some embodiments, additional user-specified values can be added directly into temporal occlusion cost generator 230 as non-linearities to be incorporated in the occlusion cost determination, or can be added directly to the saliency data generated by video image saliency generator 202 via the use of video image saliency generator controller 215. For instance, if it is important that a certain face (or a specific region of a frame or video) not be occluded, the face can be marked with high saliency in the image saliency data/map by setting a user-defined parameter via video image saliency generator controller 215. This ensures that in most cases if a face is occluded, a high occlusion cost (of one or close to one) will result from the occlusion cost determination generated by temporal occlusion cost generator 230.

In some embodiments, the operation of temporal occlusion cost generator 230 can be further refined to better calculate occlusion costs based on area compensation of occlusions of a video or portion thereof. For instance after receiving the video image saliency data and receiving the video crop for presenting an edited version of a video in a viewing region, the data pertaining to the saliency and video crop can be used to determine the occlusion cost associated with occluding of a particular area in video. Temporal occlusion cost generator 230 identifies cropped areas in the video crop. An occlusion cost is then calculated based on three co-dependent components: the total saliency density of the viewing region, the fractional saliency visible, and the scaling of an image/frame based on its total information content.

A specific instantiation of an area compensated occlusion costing calculation is shown in Table 2. The un-simplified version of the equation in Table 2 contains three components which respectively relate to the three co-dependent components: the total saliency density of the cropped frame, the fractional saliency visible, and the scaling of a frame based on its total information content.

With respect to the equation shown in Table 2, the portion of the equation related to total saliency density in the viewing region attempts to maximize the amount of visible saliency captured within the cropped frame of a video. The portion of the equation related to fractional saliency visible seeks to minimize the amount of saliency that is occluded by the cropping. The portion of the equation devoted to scaling an cropped frame based on its content seeks to create an even distribution of saliency across the viewing region by weighting the image cost toward increasing the scale of a cropped frame with high information content (e.g. a landscape, rooftops, trees, etc.) and decreasing the scale of an image with lower information content (e.g. a single face). A cost ($C_{cf}$) closer to one indicates more occlusion of salient area, while a cost closer to zero indicates lesser occlusion of salient area.

TABLE 2

Example Equation for Area Compensated Occlusion Cost of a Cropped Frame in a Video $$C_{cf} = \left(\frac{\sqrt{A_{cf}}}{S_{v,f}}\right) * \left(\frac{S_{T,f}}{S_{v,f}}\right) * \left(\frac{S_{T,f}}{\sqrt{A_f}}\right) = \sqrt{\frac{A_{cf}}{A_f}} * \frac{S_{T,f}^2}{S_{v,f}^2}$$

Where:
$C_{cf}$ is the cost associated with a particular cropped frame, cf
$S_{v,f}$ is the fraction of saliency of un-cropped frame f which is still visible after cropping
$S_{T,f}$ is the total saliency of un-cropped frame f?
$A_f$ is the area of un-cropped frame f
$A_{cf}$ is the area of cropped frame cf Temporal occlusion cost generator 230 may also calculate an occlusion costs which changes over time. This "temporal occlusion cost" takes into consideration variations in saliency with time as the video plays and different portions of the video image become more or less salient. The resulting temporal occlusion cost that is generated will not be static in time, but will instead act as a measure of saliency or "interest" in a video based upon the three dimensions of height, width, and running time of an un-cropped video as compared to a cropped version of a video.

Taking into consideration the equations shown in Table 1 and Table 2, Table 3 shows an example of one equation which temporal occlusion cost generator 230 may utilize to calculate a temporal occlusion cost of a video crop. By incorporating a time based term, $$\left(\frac{T_{cv}}{T_v}\right)^n,$$

where $T_{cv}$ is the length of the cropped video and $T_v$ is the time length of the un-cropped video, the temporal occlusion cost equation of Table 3 now generates costs which are governed by a scalable term that scales the resulting temporal occlusion cost in some proportion to the length of a video crop extracted from a video. In the equation shown in Table 3, a temporal occlusion cost ($C_{cv}$) closer to one equals nearly total occlusion of salient video content; while a temporal cost closer to zero indicates very little occlusion of salient video content. Thus a generated temporal occlusion cost would tend to favor shorter video crops over longer video crops, but only when the reduction in length is not outweighed by a reduction in the saliency. The power of "n" allows for automatic or user-selectable adjustment in the weighting between clip length and preserved saliency: a higher "n" favors shorter video crops, while a lower "n" favors longer video crops which preserve more saliency. It is appreciated that, in one embodiment, the time scaling factor could also be determined on a per frame basis.

TABLE 3

Example Equation for Determining a Temporal Occlusion Cost of a Cropped Video $$C_{cv} = \left(\frac{T_{cv}}{T_v}\right)^n * \sum_{cropped\ frames} \sqrt{\frac{A_{cf}}{A_f}} * \frac{S_{T,f}^2}{S_{v,f}^2}$$

Where:
$C_{cv}$ is the temporal occlusion cost associated with a cropped video, cf $S_{v,f}$ is the fraction of saliency of un-cropped frame f which is still visible after cropping
$S_{T,f}$ is the total saliency of un-cropped frame f
$A_f$ is the area of un-cropped frame f
$A_{cf}$ is the area of cropped frame cf
$T_v$ is the total running time of un-cropped video v
$T_{cv}$ is the running time of the video crop cv being evaluated Additionally, by adding one or more factors which provide a weighting to the amount of running time cropped from a video, the temporal occlusion cost provides a single score or number which is used to comparatively evaluate a balance between the area cropped from a video, the saliency cropped from a video, and the running time cropped from a video.

The occlusion costs generated by temporal occlusion cost generator 230 can be output in a variety of forms such as a list, a rank ordering, or a data stream, for example, on output 250 or, in some embodiments, as an input to cost minimization engine 240. For example, in some embodiments, a temporal occlusion cost for a video crop may be used as a factor to compare the quality of one received video crop to the quality of another received video crop. The temporal occlusion cost for a particular video crop can compared a default or user-specified temporal occlusion cost standard and/or to one or more temporal occlusion costs calculated for other possible (candidate) video crops which are evaluated by system 200.

Method for Cropping a Video

FIG. 12 is a flow diagram 1200 of a method, according to one embodiment, for cropping a video.

At 310 of flow diagram 1200, in one embodiment, video image saliency data is received for a video. For example, in one embodiment, system 200 of FIG. 2 utilizes video image saliency receiver 210 to receive video image saliency data. As described above, in some embodiments, the video image saliency data is received in the form of one or more video image saliency maps for a particular video. Also, as previously described, such video image saliency maps may be in received the form of one or more grayscale saliency maps. Additionally, as previously described, such video image saliency maps may be generated in accordance with one or more user-specified saliency parameters. Step 310 of flow diagram 300 is the same as step 310 of flow diagram 300 and for purposes of brevity and clarity, further explanation of step 310 will not be repeated herein.

At 1220 of flow diagram 1200, in one embodiment, a plurality of video crops is received. Each of the received video crops comprises a possible (candidate) presentation of an edited version of a video for display within a viewing region. The received video crop is configured for display within a viewing region. It is appreciated that step 1220 of flow diagram 1200 is substantially the same as step 320 of flow diagram 300 except that in step 1220 a plurality of possible (candidate) video crops is received, for example, by video crop receiver 220. For example, in one embodiment, this may comprise video crop receiver 220 receiving both video crop 600 and video crop 800. In one embodiment, as previously described, receiving a video crop comprise receiving a cuboidal volume of voxels defined within a three-dimensional space, where the three-dimensional space is defined by a height and a width of a frame of the un-cropped video along with a running time of the un-cropped video. For purposes of brevity and clarity reference is made to the explanation of step 320 for further explanation of the process of receiving a video crop.

At 1230 of flow diagram 1200, in one embodiment, the received video image saliency data is utilized to determine a plurality of temporal occlusion costs, where each of the plurality of temporal occlusion costs is associated with one of the received video crops. As previously described, in one embodiment, determining a temporal occlusion cost for a received video crop of the plurality of received video crops comprises determining a value which varies in accordance with: saliency eliminated by the received video crop, video frame area eliminated by the received video crop, and video running time eliminated by the received video crop. As previously described, in one embodiment, temporal occlusion cost generator 230 determines each of the plurality of temporal occlusion costs. Temporal occlusion cost generator 230 determines these occlusion costs in the manner previously described in conjunction with step 330 of flow diagram 300.

At 1240 of flow diagram 1200, in one embodiment, a video crop associated with a lowest temporal occlusion cost of the plurality of occlusion costs is determined. With reference to FIG. 2 and system 200, in one embodiment, cost minimization engine 240 determines the lowest temporal occlusion cost by comparing temporal occlusion costs received from temporal occlusion cost generator 230. For instance, in one embodiment, cost minimization engine 240 receives temporal occlusion costs for a plurality of video crops and then chooses the lowest temporal occlusion cost from among the evaluated video crops. Additionally, in one embodiment, a user may define a maximum acceptable temporal occlusion cost as an input to cost minimization engine 240. Thus, if all evaluated temporal occlusion costs are unacceptably high compared to this maximum defined temporal occlusion cost, cost minimization engine 240 indicates this as an output.

At 1250 of flow diagram 1200, in one embodiment, the video is cropped in accordance with the received video crop which is associated with the lowest temporal occlusion cost of the plurality of temporal occlusion costs. For example, in one embodiment, cost minimization engine 240 identifies the video crop associated with the lowest evaluated temporal occlusion cost and selects this video crop for output, for example, on output 250. For example, this selected video crop may be output for display, saving, recording, or further processing.

In some embodiments, cost minimization engine 240 uses well known mathematical modeling and projection techniques, such as steepest decent, to reduce calculations by homing in on the video crop that will have the lowest temporal occlusion cost. In one such embodiment, cost minimization engine 240 communicates with temporal occlusion cost generator 230 to steer it toward calculating occlusion costs for certain received video crops, thus saving time and reducing calculations. In one such embodiment, cost minimization engine 240 communicates with video crop generator controller 225 to affect generation of video crops which will likely have lower temporal occlusion costs than those previously evaluated. As previously described, this communication allows video crop generator 204 to be actively steered towards generating a type of video crop which will be likely to have a lower temporal occlusion cost when evaluated by system 200.

Although the subject matter of the present technology for temporal occlusion costing applied to video editing has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining a temporal occlusion cost for a video crop, said method comprising:
   receiving, at a computer system, video image saliency data for a video;
   receiving, at said computer system, a video crop for a presenting an edited version of said video within a viewing region; and
   utilizing, at said computer system, said video image saliency data to determine a temporal occlusion cost for said video crop, wherein said temporal occlusion cost comprises determining a value which represents said temporal occlusion cost, wherein said value varies in accordance with video running time removed by said video crop.

2. The method as recited in claim 1, wherein said receiving video image saliency data for a video comprises:
   receiving a video image saliency map for said video.

3. The method as recited in claim 2, wherein said receiving a video image saliency map for said video comprises:
   receiving a plurality of grayscale saliency maps, each of said grayscale saliency maps providing image saliency information for a frame of said video.

4. The method as recited in claim 1, wherein said receiving video image saliency data for a video comprises:
   utilizing a user-specified saliency parameter to control generation of said video image saliency data; and
   receiving said video image saliency data, wherein said video image saliency data is generated according to said user-specified image saliency parameter.

5. The method as recited in claim 1, wherein said receiving a video crop for a presenting an edited version of said video within a viewing region comprises:
   utilizing a user-specified video cropping constraint to control generation of said video crop; and
   receiving said video crop, wherein said video crop is generated according to said user-specified video cropping constraint.

6. The method as recited in claim 1, wherein said receiving a video crop for a presenting an edited version of said video within a viewing region comprises:
   receiving video crop comprising an aspect ratio conversion of said video.

7. The method as recited in claim 1, wherein said receiving a video crop for a presenting an edited version of said video within a viewing region comprises:
   receiving a cuboidal volume of voxels defined within a three-dimensional space, said three-dimensional space defined by a height and a width of a frame of said video along with a running time of said video.

8. The method as recited in claim 7, wherein said receiving a cuboidal volume of voxels defined within a three-dimensional space comprises:
   receiving said cuboidal volume of voxels, wherein cross-sectional areas of said cuboidal volume remain fixed over time.

9. The method as recited in claim 7, wherein said receiving a cuboidal volume of voxels defined within a three-dimensional space comprises:
   receiving said cuboidal volume of voxels, wherein cross-sectional areas of said cuboidal volume vary over time.

10. The method as recited in claim 1, wherein said determining said value which represents said temporal occlusion cost, wherein said value varies in accordance with saliency eliminated by said video crop and video frame area eliminated by said video crop.

11. A non-transitory computer-readable medium having computer-executable instructions stored thereon for causing a computer system to execute a method for cropping a video, said method comprising:
   receiving video image saliency data for a video;
   receiving a plurality of video crops, each of said plurality of video crops comprising a possible presentation of an edited version of said video within a viewing region;
   utilizing said video image saliency data to determine a plurality of temporal occlusion costs, each of said temporal occlusion costs associated with one of said plurality of possible video crops, wherein each of said temporal occlusion costs comprise determining values for temporal occlusion costs associated with a plurality of said video crops, wherein a value of said values varies in accordance with video running time eliminated by said video crop;
   determining a video crop associated with a lowest temporal occlusion cost of said plurality of temporal occlusion costs; and cropping said video in accordance with said video crop associated with said lowest temporal occlusion cost.

12. The non-transitory computer readable medium of claim 11, wherein said receiving video image saliency data for a video to comprises:
receiving a video image saliency map for said video.

13. The non-transitory computer readable medium claim 12, wherein said receiving a video image saliency map for said video comprises:
receiving a plurality of grayscale saliency maps, each of said grayscale saliency maps providing image saliency information for a frame of said video.

14. The non-transitory computer readable medium claim 11, wherein said receiving video image saliency data for a video further comprises:
utilizing a user-specified saliency parameter to control generation of said video image saliency data; and
receiving said video image saliency data, wherein said video image saliency data is generated according to said user-specified image saliency parameter.

15. The non-transitory computer readable medium claim 11, wherein said receiving a plurality of video crops further comprises:
utilizing a user-specified video cropping constraint to control generation of said video crops; and
receiving said video crops, wherein said video crops are generated according to said user-specified video cropping constraint.

16. The non-transitory computer readable medium claim 11, wherein said receiving a plurality of video crops comprises:
receiving a cuboidal volume of voxels defined within a three-dimensional space, said three-dimensional space defined by a height and a width of a frame of said video along with a running time of said video, wherein said cuboidal volume of voxels represents one of said plurality of video crops.

17. The non-transitory computer readable medium claim 11, wherein said determining said values for said temporal occlusion costs associated with said plurality of said video crops, wherein a value of said values varies in accordance with saliency eliminated by said video crop and video frame area eliminated by said video crop.

18. A system for determining a temporal occlusion cost for a video crop, said system comprising:
an video image saliency receiver configured for receiving video image saliency data associated with a video;
a video crop receiver configured for receiving a video crop to said video; and
a temporal occlusion cost generator coupled to said video image saliency receiver and said video crop receiver, said temporal occlusion cost generator configured for utilizing said video image saliency data to determine a temporal occlusion cost associated with said video crop.

19. The system of claim 18 further comprising:
a cost minimization engine coupled to said temporal occlusion cost generator, said cost minimization engine configured for selecting a minimized temporal occlusion cost from a plurality of temporal occlusion costs associated with a plurality of video crops evaluated by said temporal occlusion cost generator.

20. The system of claim 18 further comprising:
a video image saliency generator controller coupled to said video image saliency receiver, wherein said video image saliency generator controller incorporates a user-specifiable image saliency parameter for controlling generation of said video image saliency data; and
a video crop generator controller coupled to said video crop receiver, wherein said video crop generator controller incorporates a user-specifiable video cropping constraint for controlling generation of said video crop.

* * * * *

UNITED STATES PATENT AND TRADEMARK OFFICE
CERTIFICATE OF CORRECTION

PATENT NO. : 8,295,683 B2
APPLICATION NO. : 11/789201
DATED : October 23, 2012
INVENTOR(S) : Simon Widdowson It is certified that error appears in the above-identified patent and that said Letters Patent is hereby corrected as shown below:

In column 17, line 53, in Claim 1, delete "for a" and insert -- for --, therefor.

In column 18, line 13, in Claim 5, delete "for a" and insert -- for --, therefor.

In column 18, line 21, in Claim 6, delete "for a" and insert -- for --, therefor.

In column 18, line 26, in Claim 7, delete "for a" and insert -- for --, therefor.

In column 19, line 7, in Claim 13, delete "medium" and insert -- medium of --, therefor.

In column 19, line 13, in Claim 14, delete "medium" and insert -- medium of --, therefor.

In column 19, line 20, in Claim 15, delete "medium" and insert -- medium of --, therefor.

In column 19, line 29, in Claim 16, delete "medium" and insert -- medium of --, therefor.

In column 20, line 1, in Claim 17, delete "medium" and insert -- medium of --, therefor.

Signed and Sealed this
Nineteenth Day of March, 2013

Teresa Stanek Rea
*Acting Director of the United States Patent and Trademark Office*